Feb. 18, 1941. M. LIGON 2,232,007
TEA WAGON
Filed Oct. 12, 1939 2 Sheets-Sheet 2
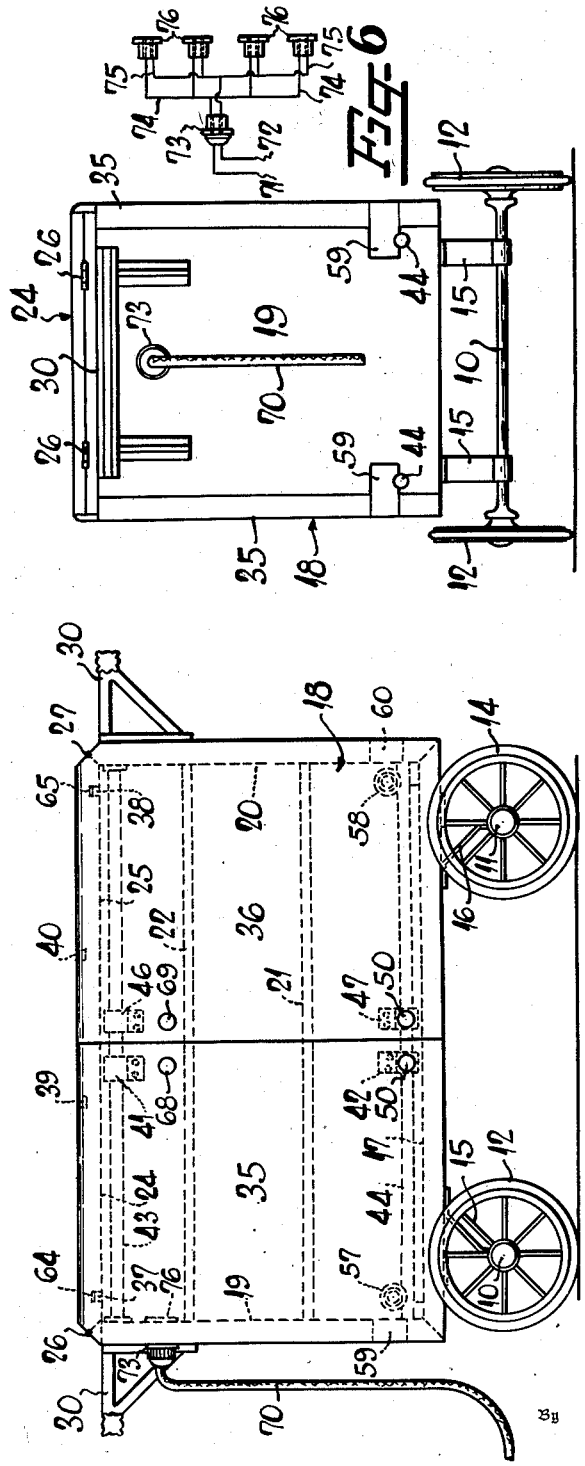
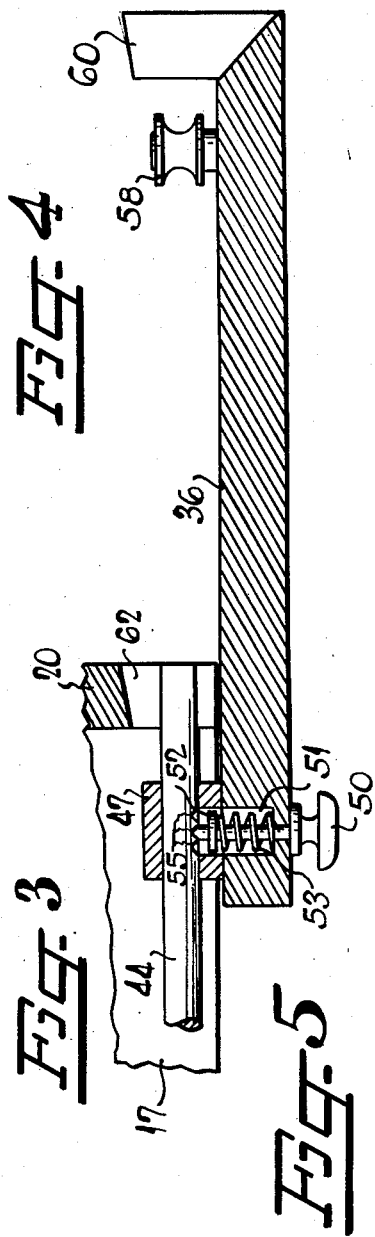
Inventor:
MAURINE LIGON Patented Feb. 18, 1941

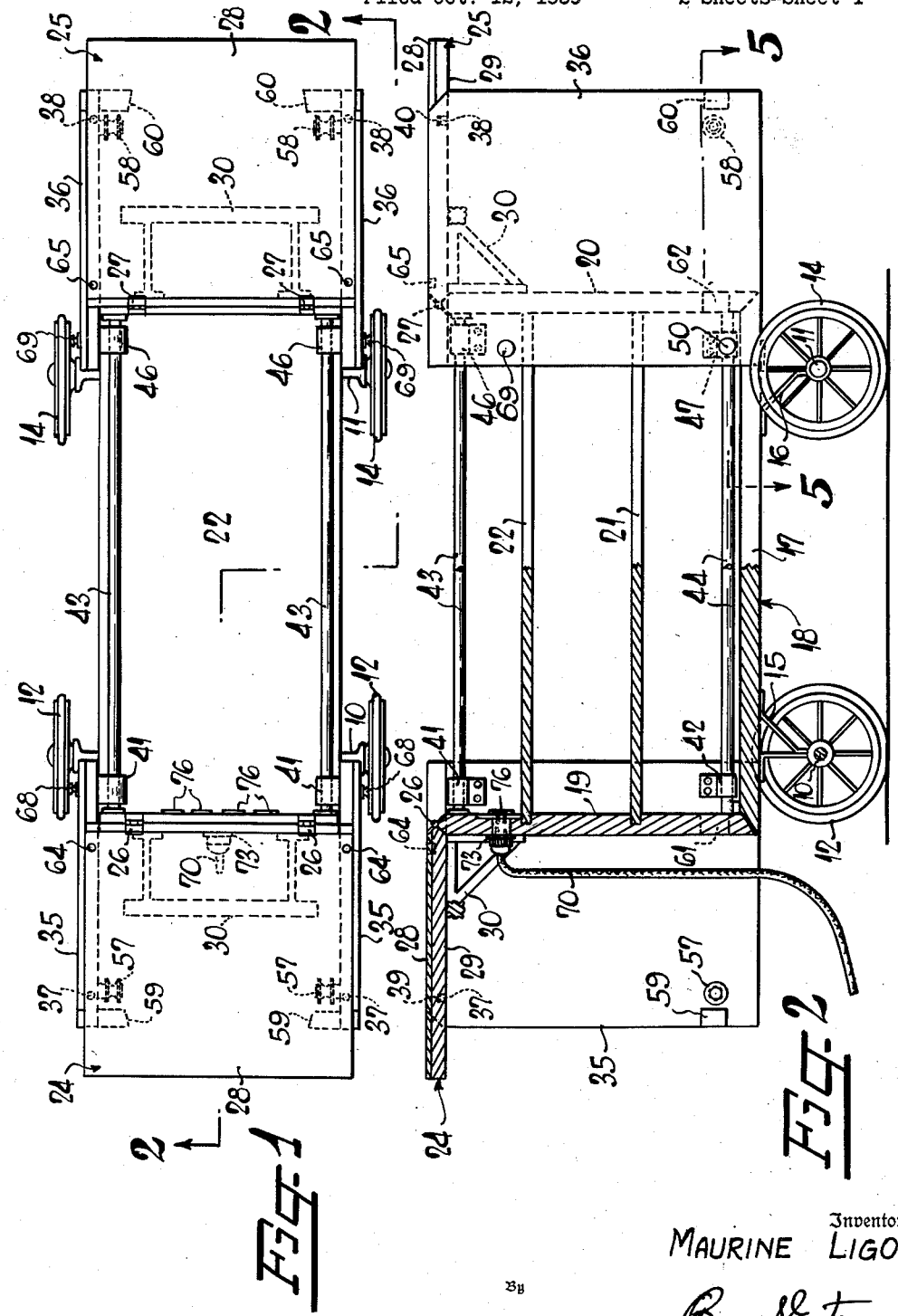

2,232,007

UNITED STATES PATENT OFFICE 2,232,007

TEA WAGON

Maurine Ligon, Philadelphia, Pa.

Application October 12, 1939, Serial No. 299,159

5 Claims. (Cl. 296—24)

This invention relates to an article of furniture and more especially to a portable electric tea wagon designed for use as a storage device as well as a convenient support for electrical appliances, service trays and other utensils during serving and preparation of food stuffs. It is a well known fact that the surfaces of chromium and silver plated articles such as percolators, toasters, waffle irons, grills, and the like become dull when exposed to the atmosphere. In order to restore their original lustre it is necessary to polish them. This polishing operation requires much labor and also wears down the article. It is therefore an object of this invention to provide a tea wagon having storage space therein for accommodating these articles when not in use, and for preventing the drafts of air from contacting the polished surfaces and causing oxidation.

It is a further object of this invention to provide an electric tea wagon equipped with multiple plugs connected by a single master cord to an electric outlet such as a wall outlet. These plugs are so positioned on the tea wagon that various electrical appliances can be connected thereto so as to prepare food stuffs, such as rarebits, crepe suzettes, coffee, tea and the like upon the wagon. By providing a single cord leading to a plurality of plugs on the wagon, a tangled mass of cord lying across the floor is eliminated thereby giving the hostess a compact arrangement and making it possible to easily control the various cooking utensils connected to the plugs. The present cabinet structure is so constructed that the covers are hinged to the top so that the free ends open out from the center. A Monel metal or Bakelite cooking surface preferably forms the upper sides of the covers when in open position on which a grill, toaster, percolator or other cooking utensils may be operated by the hostess. The sides of this cabinet structure are equipped with lateral sliding panel doors and these doors support the hinged top covers when extended. When the doors are opened and the top members are extended the shelves on the interior of the cabinet structure are visible and are readily accessible for supporting such things as waffle batter, stirring spoons, eggshells, and the like.

The present invention is virtually a portable electric bar which can be used daily in every season of the year and in every room of the house. In the summer it can be used on the porch, terrace, or in the garden.

It is suitable for cottage, mansion, sick room, city apartments, or college suites, which makes its market an unlimited one and at the same time furthers the popularity and increases the sale of electrical appliances.

Some of the objects of the invention having been stated, other objects will appear as the description proceeds when taken in connection with the accompanying drawings, in which—

Figure 1 is a top plan view of my improved electric tea wagon showing the parts in extended position;

Figure 2 is a view partly in vertical section, taken along the line 2—2 in Figure 1;

Figure 3 is an elevation of the electric tea wagon showing the parts in closed position;

Figure 4 is an end view looking at the left-hand end of Figure 3;

Figure 5 is a sectional plan detail view taken along the line 5—5 in Figure 2;

Figure 6 is a schematic electrical wiring diagram of the tea wagon.

Referring more particularly to the drawings the numerals 10 and 11 denote suitable axles upon which are rotatably mounted wheels 12 and 14 respectively. Extending from the axles 10 and 11 are suitable brackets 15 and 16, the upper ends of which support base board 17 of cabinet structure 18. Vertically disposed end boards 19 and 20 are secured to the ends of the base board 17, and shelves 21 and 22 are also secured between the end boards, for supporting the utensils and the like while in storage as well as while the foodstuffs are being prepared on other parts of the cabinet structure, hereinafter to be described. In use, the shelves are preferably used for supporting foodstuffs, "fixin's" and condiments.

The upper ends of the end boards 19 and 20 have covers 24 and 25 pivoted thereto as at 26 and 27 respectively. It is preferable to construct the covers 24 and 25 in a plurality of layers. For example, each of the cover boards 24 and 25 should have a metallic or other suitable fire and water proof surface 28 disposed on the upper side when the parts are in unfolded position as shown in Figures 1 and 2 so that the cooking utensils when placed thereon would not damage the surface. The lower side of the covers are preferably provided with a layer of material 29 which corresponds to the exterior surfaces of the cabinet so that when the covers 24 and 25 are folded inwardly to a closed position as shown in Figures 3 and 4, the exterior appearance of all portions of the cabinet will be similar to provide a pleasing article of furniture. Each of the end boards 19 and 20 has a suitable handle 30 secured thereto near the upper exterior side thereof which handles are used for pushing and pulling the structure to the desired location.

The handles 30 may be so positioned near the upper ends of the boards 19 and 20 as to provide a support for the unfolded covers 24 and 25 when they are in the position shown in Figures 1 and 2. However, other means are provided for supporting the top covers when in extended position. One of the handles may be dispensed with, if desired. This supporting means comprises side doors 35 and 36, there being two side doors 35 which support the opposed edges of the cover 24 and two side doors 36 which support the opposed edges of the cover 25.

Extending upwardly from the upper edges of the side doors 35 and 36, pins 37 and 38 may be provided if desired, which penetrate suitable holes or bores 39 and 40 in the lower side of cover members 24 and 25 (see Figures 1 and 2). The proximate vertical faces of the doors 35 have brackets 41 and 42 secured thereto, said brackets being slidably mounted upon upper and lower rods 43 and 44 respectively.

When the doors 35 and 36 are in an extended position it is necessary to provide means for anchoring the lower brackets 42 and 47 to the lowermost rods 44 so that the cantilevered end of the doors will remain in position. The means for anchoring these brackets to the rods 44 is shown (Figure 5) in connection with the brackets 47 but since the structure of bracket 42 is identical to bracket 47, like reference characters will be applied to like parts. The bracket 47 has a pin 50 penetrating the same, said pin also penetrating the bore 51 in door 36. The pin 50 has a collar 52 secured therearound and within the bore 51. This collar serves to confine a compression spring 53 around the pin and within the bore, said spring normally forcing the pointed end of the pin 50 into suitable notches 55 cut in rod 44. When it is desired to close the doors 36, if the anchoring means are employed, it is necessary to pull the pin 50 outwardly, at which time, the bracket 47 will be free to slide upon the rod 44. Since the bracket 46 thereabove is not equipped with any such holding device it is free to slide at any time.

The doors 35 and 36 should have some means for supporting their lower outer corners when the doors are in a closed position as shown in Figure 3. This means comprises rollers 57 and 58 which are secured to the inner faces of the doors 35 and 36 and which are adapted to rest upon the upper sides of rods 44. These rollers are flanged so as to fit down upon opposed sides of the rods and prevent the doors 35 and 36 from moving laterally or downwardly.

It is necessary to extend the rods 44 through the end walls 19 and 20 so that the rollers 57 and 58 can move longitudinally of the cabinet during the extension or closing of the same. Figures 2 and 4 show the the construction employed at the ends of the rods 44. It is here seen that the doors 35 and 36 have inturned projections 59 and 60 respectively which projections are adapted to fit into notches 61 and 62 cut in the end walls 19 and 20. These projections merely serve to close these notches when the doors are in a closed position whereas when the notches are open, space is provided for the movement of the rollers 57 and 58 therethrough onto the rods 44.

When the doors 35 and 36 are in a closed position, the pins 37 and 38 extending from the upper ends thereof, if present, are adapted to fit into another set of cavities 64 and 65 which are cut in the opposite side of the covers 24 and 25. These pins and cavities may be dispensed with, if desired. Figure 3 shows these projections when fitted in the manner just described. When the pins 37 and 38 fit into the holes 64 and 65, the upper side of the doors 35 and 36 are held against movement either laterally or longitudinally, whereas the lower side of these same doors are held in a stationary position by means of the flanged rollers 57 and 58. Of course the brackets 41, 42, 46 and 47 also tend to hold the sliding doors in stationary position. The doors 35 and 36 are equipped with buttons 68 and 69 respectively which may be grasped when it is desired to open or close the same.

The operation of this device is comparatively simple, because when it is desired to open the cabinet from the position shown in Figure 3 to the position shown in Figures 1 and 2 it is only necessary to raise the doors 24 and 25 to a vertical position about their hinges 26 and 27. When the doors 35 and 36 are moved outwardly to extended position, after which the covers 24 and 25 are lowered until the cavities 39 and 40 in one side thereof, fit over pins 37 and 38 extending upwardly from the sliding doors. Of course when the doors 35 and 36 are pulled to extended position the pins 50 in brackets 42 and 47 will engage the notches 55 in one of the rods 44.

A very convenient feature about this cabinet is the wiring and outlets for the electrical appliances. It is seen that an outlet cord 70 is provided with wires 71 and 72 therein which lead to a plug 73 in the upstanding board 19. Plug 73 has wires 74 and 75 leading therefrom, the other ends of said wires being connected to plugs 76. The plugs 76 are conveniently located so that various utensils such as percolators, toasters and the like can be easily connected or disconnected without having to plug into a wall socket. By providing this simple arrangement only one cord, namely, cord 70, is necessary to lead from the tea wagon to a source of current.

In the drawings and specification there have been set forth a preferred embodiment of the invention and although specific terms have been employed, they are used in a generic and descriptive sense only and not for purposes of limitation, the scope of the invention being set forth in the appended claims.

I claim:

1. A tea wagon comprising a wheeled framework having a plurality of longitudinally disposed superposed shelves therein and having sides supported by the framework and slidable along the framework to expose said shelves to view and a top member comprising a pair of top sections hinged to the framework at their outer ends and foldable upwardly and outwardly to rest on the upper edges of the extended side portions.

2. A tea wagon comprising bottom, ends, and a pair of top members each hingedly secured to the upper end of the end members, a pair of rods disposed on each side of the wagon and forming trackways, a pair of side members mounted for movement on each pair of said rods whereby the side members can be moved apart from each other to a position where they will project substantially beyond the ends of the wagon and where the outfolded top members will rest on the upper edges of the side members, a plurality of superposed shelves disposed between the end members.

3. A tea wagon comprising a shelved framework, a pair of top members hinged at their outer ends to the framework and normally covering the top of the framework, a pair of doors slidably mounted on each side of the framework and being slidable away from each other to uncover the sides of the framework, and means for securing the outwardly moved side doors and the unfolded top members together.

4. A tea wagon comprising a wheeled framework having a plurality of superposed shelves therein and having sides supported by the framework and slidable along the framework to expose said shelves to view and a pair of extensible top sections for the framework, said extensible top sections being movable outwardly to rest on the upper edges of the extended side portions.

5. A tea wagon comprising a shelved framework, a pair of extensible top members on the framework and normally covering the top of the framework, a pair of doors slidably mounted on each side of the framework, and being slidable away from each other to uncover the sides of the framework, and means for securing the extensible top sections and the outwardly moved side doors together.

MAURINE LIGON.